United States Patent [11] 3,619,320

| [72] | Inventors | Heinz Mueller-Tamm<br>Ludwigshafen/Rhine;<br>Hans Frielingsdorf, Bad Duerkheim, both<br>of Germany |
|---|---|---|
| [21] | Appl. No. | 756,376 |
| [22] | Filed | Aug. 30, 1968 |
| [45] | Patented | Nov. 9, 1971 |
| [73] | Assignee | Badische Anilin & Soda-Fabrik<br>Aktienzesellschaft<br>Ludwigshafen am Rhine, Germany |
| [32] | Priority | Sept. 7, 1967 |
| [33] | | Germany |
| [31] | | P 17 04 493.8 |

[54] PRODUCTION OF PLANE THREE-PLY MATERIALS FOR PLANE BUILDING COMPONENTS
4 Claims, No Drawings

[52] U.S. Cl. .................................................... 156/244, 156/309
[51] Int. Cl. ........................................................ B29c 19/00
[50] Field of Search ............................................ 156/244, 306, 324, 309; 161/116, 165

[56] References Cited
UNITED STATES PATENTS

| 3,026,229 | 3/1962 | Wilcox | 156/309 |
| 3,054,703 | 9/1962 | Brasure | 156/309 X |
| 3,193,428 | 7/1965 | Palmer | 156/309 X |
| 3,311,862 | 3/1967 | Rees | 156/309 X |
| 3,436,297 | 4/1969 | Brooks et al. | 156/244 X |
| 3,443,277 | 5/1969 | Frielingsdorf | 156/244 X |
| 3,476,627 | 11/1969 | Squires | 156/244 |

Primary Examiner—Carl D. Quarforth
Assistant Examiner—Stephen J. Lechert, Jr.
Attorney—Johnston, O'Keefe, Keil, Thompson & Shurtleff ABSTRACT: A process for the production of plane three-ply materials for plane building components, which materials consist of a relatively thick inner ply of a thermoplastic and relatively thin outer plies of another thermoplastic. The process comprises preparing a board of polyethylene by means of a screw extruder at elevated temperature and covering the board on both sides with a film of a terpolymer at elevated temperature by means of a pair of rollers to form a sandwich assembly. The terpolymer must have a specific chemical composition; it is prepared from (1) a predominant amount of ethylene, (2) a relatively low amount of an ethylenically unsaturated carboxylic acid and (3) a relatively low amount of an ester of an ethylenically unsaturated carboxylic acid.

PRODUCTION OF PLANE THREE-PLY MATERIALS FOR PLANE BUILDING COMPONENTS

The present invention relates to a method of preparing plane three-ply materials for plane building components which materials consist of a relatively thick inner ply of a thermoplastic and relatively thin outer plies of another thermoplastic.

In a known method of this type for example a relatively thick board of impact-resistant polystyrene, whose surfaces are matt as a result of its manufacture, is coated by means of laminating equipment with high-gloss film of unmodified polystyrene in such a way that the plastics film is pressed onto the plastics board immediately after the latter has been extruded and while it is still hot. The plane product can then be coated in a second operation with relatively thin plies of metal so that plane building components are obtained having particularly great stiffness. When polyethylene is used in the said method for the thick inner ply and film of the known hot-melt adhesives for the outer plies, the adhesion either between the polyethylene and the film of hot-melt adhesive or between the film of hot-melt adhesive and the layer of metal (to be applied later) is inadequate for most applications.

The present invention has for its object to provide a method of the type referred to above in which a material is obtained whose individual plies (including the metal layers to be applied later) have improved adhesion to each other.

We have found that this object can be achieved by applying to a special type of polyethylene a special adhesion-promoting layer.

In accordance with this invention a process of the type referred to above comprises extruding a board having a thickness of from 1 to 20 mm. continuously by means of a screw extruder at a temperature of the material of 120° to 220° C., preferably 160° to 180° C., from a polyethylene having a density of 0.918 to 0.930 g./cm.$^3$ and having a melt index (according to ASTM D 1238–65 T) of from 0.2 to 5, combining the resultant board by means of a pair of rollers continuously on both sides at a temperature of the material of from 100° to 200° C., preferably 120° to 160° C., 160° C., with a film having a thickness of 0.01 to 0.2 mm. and consisting of a terpolymer containing 60 to 90 parts by weight of ethylene units, 0.5 to 20 parts by weight of units of an ethylenically unsaturated carboxylic acid and 0.5 to 20 parts by weight of units of an ester of an ethylenically unsaturated carboxylic acid (the sum of the parts by weight being 100) under a rolling pressure of 0.1 to 4 kg./cm.$^2$ to form a sandwich assembly and cooling the resultant plane three-ply material, or allowing it to cool, to ambient temperature.

In an advantageous embodiment of the process according to this invention use is made of a film of a terpolymer which contains 71 to 90 parts by weight of ethylene units, 3 to 9 parts by weight of units of an aliphatic ethylenically unsaturated carboxylic acid having three to five carbon atoms and 1 to 20 parts by weight of units of an alkyl ester (having one to eight carbon atoms in the alkyl group) of an aliphatic ethylenically unsaturated carboxylic acid having three to five carbon atoms, the sum of the parts by weight amounting to 100.

In a particularly advantageous embodiment of the process according to this invention use is made of a film of a terpolymer which contains 71 to 90 parts by weight of ethylene units, 3 to 9 parts by weight of acrylic acid units and 1 to 20 parts by weight of tertiary-butyl acrylate units, the sum of the parts by weight being 100.

Commercial polyethylene having a density of from 0.918 to 0.930 g./cm.$^3$ and a melt index of 0.2 to 5 is suitable for carrying out the process according to this invention. The film of a terpolymer of the specified composition, which is essential for the process of the present invention, may be prepared from the terpolymer (known per se) by method conventionally used for making films from ethylene polymers. It is advantageous for the terpolymers used to have the following physical data: density: 0.9 to 1.1 g./cm.$^3$; crystalline fraction: less than 60 percent; melting range: 70° to 120° C.; Shore hardness C: 50 to 90.

Conventional equipment for preparing and coating plastics boards may be used for preparing the plane materials according to this invention. The equipment may consist in the present case of a screw extruder, a pair of rollers and a cooling zone. The extruded board and the adhesive film may be bonded together by contacting these elements in the nip of the two rollers, the hot board thus causing temporary melting of the adhesive film. After bonding has taken place, the product is allowed to cool (or is cooled in a cooling tunnel) to ambient temperature.

Plane building components can be made from the materials prepared according to this invention by applying relatively thin layers of metal to one or both sides under the action of pressure and heat in a conventional manner, for example in a heated board press.

The invention is illustrated by the following example.

EXAMPLE

A board having a thickness of 3 mm. is extruded continuously from a polyethylene having a density of 0.918 g./cm.$^3$ and a melt index of 1.5 by means of a screw extruder having a 90 mm. screw and a sheeting die 600 mm. in width at a mass temperature of 190° C. The board, while still hot (mass temperature about 160° C.), is coated on each side with a 0.1 mm. thick film of a terpolymer (consisting of 88 percent by weight of ethylene units, 2.7 percent by weight of acrylic acid units and 9.3 percent by weight of tertiary-butyl acrylate units) by means of a pair of rollers heated to 70° C. under a pressure of 1 kg./cm.$^2$. It is then allowed to cool to room temperature. The output of the screw extruder is about 180 kg. of polyethylene per hour. The corresponding rate of production is 1.6 meters per minute.

We claim:

1. A process for the production of plane three-ply materials for plane building components which are composed of a relatively thick inner ply of a thermoplastic polymer and relatively thin outer plies of another thermoplastic polymer, which process comprises extruding a sheet having a thickness of 1 to 20 mm. of polyethylene having a density of from 0.918 to 0.930 g./cm.$^3$ and a melt index of 0.2 to 5 (according to ASTM D 1238–65 T) at a polyethylene mass temperature of from 120° to 220° C., and applying to each face of said sheet at a polyethylene sheet temperature of 100° to 220° C. a preformed film having a thickness of 0.01 to 0.2 mm. and consisting of a terpolymer which consists of 60 to 90 parts by weight of ethylene units, 0.5 to 20 parts by weight of units of an ethylenically unsaturated carboxylic acid and 0.5 to 20 parts by weight of units of an ester of an ethylenically unsaturated carboxylic acid, the sum of the parts by weight being 100 a pressure of 0.1 to 4 kg./cm.$^2$ and cooling the resultant laminate to obtain said three-ply material with said films adhered to said faces.

2. A process as claimed in claim 1 wherein a film of a terpolymer consisting of 71 to 90 parts by weight of ethylene units, 3 to 9 parts by weight of units of an aliphatic ethylenically unsaturated carboxylic acid having three to five carbon atoms and 1 to 20 parts by weight of units of an alkyl ester having one to eight carbon atoms in the alkyl group of aliphatic ethylenically unsaturated carboxylic acid having three to five carbon atoms, the sum of the parts by weight amounting to 100, is used.

3. A process as claimed in claim 1 wherein a film of a terpolymer is used which contains 71 to 90 parts by weight of ethylene units, 3 to 9 parts by weight of acrylic acid units and 1 to 20 parts by weight of units of the tertiary-butyl ester of acrylic acid, the sum of the parts by weight amounting to 100.

4. A process as claimed in claim 1 wherein the terpolymer has the following physical data: density: 0.9 to 1.1 g./cm$^3$; crystalline fraction: less than 60 percent; melting range: 70° to 120° C.; Shore hardness C: 50 to 90.

* * * * *

PO-1050
(5/69)

UNITED STATES PATENT OFFICE
CERTIFICATE OF CORRECTION

Patent No. 3,619,320　　　　　　Dated November 9, 1971

Inventor(s) Heinz Mueller-Tamm and Hans Frielingsdorf

It is certified that error appears in the above-identified patent and that said Letters Patent are hereby corrected as shown below:

First Page, left-hand column, eighth and ninth lines, "Badische Anilin & Soda-Fabrik Aktienzesellschaft" should read -- Badische Anilin- & Soda-Fabrik Aktiengesellschaft --; right hand column, after "Attorney-", "Johnston, O'Keefe, Keil, Thompson & Shurtleff" should read -- Johnston, Root, O'Keeffe, Keil, Thompson & Shurtleff --.

Column 1, line 39, "160° C., with a" should read -- with a --.

Column 2, line 51, "a pressure of 0.1 to 4 kg./cm. and" should read -- under a pressure of 0.1 to 4 kg./cm., and --; line 59, "of" should read -- of an --.

Signed and sealed this 2nd day of May 1972.

(SEAL)
Attest:

EDWARD M. FLETCHER, JR.　　　　　ROBERT GOTTSCHALK
Attesting Officer　　　　　　　　Commissioner of Patents